United States Patent
Kressel et al.

(10) Patent No.: US 6,690,829 B1
(45) Date of Patent: Feb. 10, 2004

(54) CLASSIFICATION SYSTEM WITH REJECT CLASS

(75) Inventors: Ulrich Kressel, Ulm (DE); Frank Lindner, Ulm (DE); Christian Wöhler, Neu-Ulm (DE)

(73) Assignee: DaimlerChrysler AG (DE)

( * ) Notice: Subject to any disclaimer, the term of this patent is extended or adjusted under 35 U.S.C. 154(b) by 683 days.

(21) Appl. No.: 09/654,694

(22) Filed: Sep. 5, 2000

(30) Foreign Application Priority Data

Sep. 3, 1999 (DE) .......................................... 199 42 223

(51) Int. Cl.$^7$ ................................................ G06K 9/62
(52) U.S. Cl. ...................... 382/225; 382/156; 382/160; 382/228; 706/13; 706/20; 706/26
(58) Field of Search ................................ 382/156–161, 382/181, 190, 192, 224–228; 706/12–16, 20, 25–26

(56) References Cited

U.S. PATENT DOCUMENTS

| 5,123,057 | A | * | 6/1992 | Verly et al. | 382/156 |
| 5,966,701 | A | * | 10/1999 | Kohda et al. | 706/20 |
| 6,337,927 | B1 | * | 1/2002 | Elad et al. | 382/225 |
| 6,345,119 | B1 | * | 2/2002 | Hotta et al. | 382/225 |
| 6,549,661 | B1 | * | 4/2003 | Mitsuyama et al. | 382/224 |

FOREIGN PATENT DOCUMENTS

| DE | 44 04 775 C1 | 7/1995 | G06K/9/66 |
| DE | 198 02 261 A1 | 7/1999 | G06T/1/40 |

OTHER PUBLICATIONS

Aksela, M.; Laaksonen, J.; Oja E; Kangas, J.; Document Analsyis and Recongnition, 2001. Proceedings. Sixth International on, Sep. 10–13, 2001 pp. 982–986.*
Niemann, H., "Klassifikation von Mustern", Spinger–Verlag, Berlin Heidelberg New York Tokyo 1983.
Schurmann, J., "Palfern Classification", Chapter 10, Reject Criteria and Classifier Performance, 1996, Wiley–Intersciences, New York.
Oren, Michael, et al., "Pedestrian Detection Using Wavelet Templates", IEEE Conf. on Computer Vision and Pattern Recognition, S. 193–199, San Juan, 1997.

* cited by examiner

Primary Examiner—Bhavesh M. Mehta
Assistant Examiner—Gregory Desire
(74) Attorney, Agent, or Firm—Pendorf & Cutliff

(57) ABSTRACT

A process for the processing of signals by which signal S is optimally verified for association with objects of a desired class $Z_k$ (wherein (with $1<=k<=$number of different classes) and differentiated from undesired objects. One or more classes $Z_A$ of undesired objects, and beyond this, as an additional class, a rejection class R is defined, to which all signals are assigned which are not clearly assignable to one of classes $Z_k$ or $Z_A$. Herein the decision criteria under which a signal S is assigned to the reject class R is the comparison of the output value $P_{reject}$ with the adjustable threshold value t, which is provided by a classification algorithm.

22 Claims, No Drawings

CLASSIFICATION SYSTEM WITH REJECT CLASS

BACKGROUND OF THE INVENTION

The invention concerns a method of signal processing, wherein signals S are checked for belonging to objects of desired classes $Z_k$ and differentiated from objects in an undesired class $Z_A$.

DESCRIPTION OF THE RELATED ART

In order not to skip over any objects of relevance, segmenting algorithms produce, in general, a large number of hypotheses whose examination requires a large expenditure of time. Another disadvantage is that a segmenting algorithm can often only consider a small number of attributes of the object to be segmented, such as shape or color, in order to analyze in real time a complete picture or at least a region of a picture in which new objects can knowingly emerge. In the case of a segmentation of circular traffic signs in a street scene, the segmentation is performed, in general, via a Hough-transformation (K. R. Castelman; Digital Image Processing, Prentice Hall, New Jersey, 1996) or a distance transformation that is based upon a matching algorithm (D. M. Gavrilla; Multi-Feature-Hierarchical Template Matching Using Distance Transforms, IEEE Int. Conf. on Pattern Recognition, pp 439–444, Brisbane, 1998), all in order to find all shapes typical for a circular traffic sign.

For a classification, which follows such a segmentation, the principal problem is not the differentiation of the different objects of the class $Z_k$ (e.g. traffic signs) from each other, but rather the difficulty of differentiating the objects of this class $Z_k$ from the objects of the undesired class $Z_A$. Therein the objects of the undesired class $Z_A$ consist of any image field which are selected by the segmentation algorithm due to their similarity to objects of the class $Z_k$.

This leads to a two class problem, in which certainly only the class $Z_k$ is more or less locatable in the feature realm or set, while the class $Z_A$ is widely scattered over the feature set. Therein, in general, it is not possible to find a limited number of 'typical' objects, that are associated with the class $Z_A$. Were number of objects of the class $Z_A$ so limited, then it would be possible to generalize a classifier starting from a set of learning examples of the total variations of possible elements of the class $Z_A$; assuming that objects are limited to those from a closed world (closed world assumption) from which the general classification theory originates is damaged in this case.

In reality, most of the objects produced by a segmentation algorithm belong to the class $Z_A$. In the case of traffic sign recognition these are typically more than 95 percent, which further complicates the classification problem.

SUMMARY OF THE INVENTION

The task of the invention is to develop a signal processing method, which has high certainty while processing the signal in real time and avoiding a false classification of objects of the class $Z_A$, i.e. that the probability is kept low that objects of class $Z_A$ will be falsely assigned to one of class $Z_k$.

DETAILED DESCRIPTION OF THE INVENTION

The problem is solved through a signal processing method, by which signal S is verified through the association of objects in the desired classes $Z_k$ (with 1<=k<=number of different classes) and differentiated from objects of the undesired classes $Z_A$, wherein a reject class R is defined as an additional class of objects to which all signals S will be assigned that can not be positively assigned to one of classes $Z_k$ or $Z_A$. Herein the comparison to an adjustable threshold t with an initial value $P_{reject}$, which is provided by a classification algorithm, serves as an evaluation criteria with respect to an assignment of a signal S to the rejection class R.

The threshold value t is generally selected, in the practical implementation of the method of the invention, so as to minimize the probability of the false classification of objects associated with the undesired classes $Z_A$ (false positives), even if this also leads to an increased probability of a false classification of objects as belonging to the desired classes $Z_k$. This imbalance in the design of the signal processing method is tolerable, because in a real environment the invention is implemented in a signal processor which constantly acquires real, available objects of the classes $Z_k$, which are gathered repetitively over successively following time segments. Accordingly it is extremely improbable that these objects will not be discovered during the total period that detection is enabled (U. Franke et al.; Autonomous Driving Goes Downtown, IEEE Intelligent Systems, November/December 1998, pp 40–48).

A beneficial embodiment of the invention utilizes a polynomial classifier as the classification algorithm that supplies a value for $P_{reject}$ to which the threshold level t is compared. Therein the classification algorithm is so designed that the output value $P_{reject}$ describes the square of the distance to the output vector of the classification algorithm from the nearest lying vector in the decision set that describes a class. This value is also referred to in the literature as a RAD-Criteria. The so produced value $P_{reject}$ is now compared to the threshold value t, and in the case where the $P_{reject}$ is larger than the threshold value t, the signal will be assigned to the reject class R.

A further possible embodiment of the invention results in the case of using a radial-basis-function classifier as the classification algorithm that provides a value $P_{reject}$, which is compared with the threshold value t.

In an advantageous embodiment the radial-basis-function classifier is based upon a set of ramp functions $R(d_i)$. These ramp functions are defined through two parameters $a_i$ and $b_i$, according to:

$$R(d_i) = \begin{cases} 1 & \text{if } d_i \leq a_i \\ \frac{b_i - d_i}{b_i - a_i} & \text{if } a_i < d_i < b_i \\ 0 & \text{if } d_i \geq b_i \end{cases} \quad (1)$$

Therein the parameters $a_i$ and $b_i$ are determined from the objects contained in the training set of the classes $Z_k$ starting from a clustering-algorithm.

It has been found that an agglomeration clustering algorithm is especially useful as a clustering-algorithm, which serves as a starting point for the determination of the parameters $a_i$ and $b_i$. It is, however, also conceivable to use any other suitable algorithm for the clustering of vectors. By the advantageously implemented agglomeration clustering algorithm, the clustering takes place in 4 processing steps a)–d), which are performed as follows:

a) first a number $M_k$ of objects of the class $Z_k$ in an amount corresponding to the training set reference vectors $G_i$, is determined. These reference vectors $G_i$ correspond to the $M_k$ objects of classes $Z_k$ in the feature set and will be weighted with the weighting $W_i=1$, for $1<=i<=Mk$, b) subsequently, for each reference vector $G_i$ the one reference vector $G_j$ is determine that is the nearest lying to this and subsequently $G_i$ and $G_j$ are merged to a cluster pair $(G_i, G_j)$.

c) the so formed cluster pair $(G_n, G_m)$ is replaced by a new vector $G_p$ that is determined according to the equation $G_p=(w_n G_n+w_m G_m)/(w_n+w_m)$, and to which the weight $w_p=(w_n+w_m)$ is assigned. Finally, the data of the newly determined vectors $G_p$ and their weights $W_p$ take the place in the original data point of the original reference vectors $G_i$ and their weights $w_i$.

d) The processing steps b) and c) are now repeated until the number of remaining reference vectors $G_i$ is smaller than a given number N, or the minimal distance between the single reference vectors $G_i$ becomes larger than a freely selectable distance value $D_{min}$.

The process of favorably selecting the distance values $D_{min}$ will be further described in later parts of this specification.

After performing clustering the reference vectors $G_i$ are used to determine the intermediate parameters $e_i$, $f_i$, $\mu_k$ and $\mu_{ave}$. This takes place in steps e)–h), which are described as follows:

e) for each reference vector $G_i$, a parameter $e_i$ is determined, which describes the distance from this reference vector to the nearest cluster center of the same class.

f) for each reference vector $G_i$ a parameter $f_i$ is determined, which describes the distance from this reference vector to the nearest cluster center of one of the other classes.

g) for each class k the mean distance of all of the clusters $\mu_k$ belonging to this class to each other is determined.

h) a mean distance $\mu_{ave}$ will be determined which corresponds to the mean value of all $\mu_k$.

From the intermediate parameters $e_i$, $f_i$, $\mu_k$ and $\mu_{ave}$, the parameters $a_i$ and $b_i$ can now be determined via an assignment rule:

$$a_i = \begin{cases} 0 & \text{if } e_i > b_i \\ e_i & \text{if } e_i < b_i/T \\ \dfrac{b_i - e_i}{T-1} & \text{Otherwise} \end{cases} \quad (2a)$$

$$b_i = \begin{cases} \mu_{ave} & \text{if } f_i > \mu_{ave} \\ f_i & \text{Otherwise} \end{cases} \quad (2b)$$

In the scope of this assignment rule the parameter T will be initialized with a value larger than or equal to 2. Initializing T to equal 3 is advisable, whereby one obtains a value of $R(d_i)=0.5$ for the nearest cluster of two different classes.

The value $P_{reject}$ is now determined for each signal S according to the Ramp function $R(d_j)$ of the radial basis classifier.according to the following described method with the intermediate steps i)–k):

i) the distances $d_i$ to all reference vectors $G_i$ is calculated for the signal S j) the radial basis function classifier calculates the corresponding value $R(d_j)$ for each of the distances $d_i$.

k) Subsequently, a value $P_{sk}$ is calculated for each class k, which consists of the sum of all $R(d_i)$ that are associated with this class.

l) The sum of all $P_{sk}$ provides the intermediate value $S_p$.

The measure for the probability $P_k$, that a signal S belongs to a determined class k is determined from the parameters $P_{sk}$ and $S_p$ through an assignment rule as follows:

$$P_k = \begin{cases} P_{sk}/S_p & \text{if } S_p > 1 \\ P_{sk} & \text{if } S_p \leq 1 \end{cases} \quad (3)$$

Following this determination, $P_{reject}$ is now obtained from the value of the largest of all values $P_k$. If the results of the comparison of $P_{reject}$ to the threshold value t indicates that $P_{reject}$ is smaller than the threshold value t, then that signal S is assigned to the reject class R.

As an additional reject class criteria used with-the radial-basis-functions classifier, in the case where $S_p$ is smaller than or equal to one, an additional parameter, $P_{back}$, is generated and is set to the value 1-Sp. In the case where $P_{back}$ is larger than of the values $P_k$ calculated for the signal S, then this signal will be assigned to the reject class R.

Beneficially, the quality of the outcomes delivered by the classifier can be improved if bootstrapping is applied within the scope of the classifier training. This technique is so targeted, that in the training of the classifier the set of training data which contains only such objects of the class $Z_A$ which are near objects in class $Z_k$, which in the feature set are near the objects in class $Z_k$.

The bootstrapping occurs by the use of a radial-basis-function classifier in the scope of the clustering process to determine the parameters $a_i$ and $b_i$.

In a first step of clustering no distinction is initially made between the classes $Z_k$ and $Z_A$. The free selectable distance value $D_{min}$ is chosen to be very large (see also the above processing step "d)"), so that only a small number of reference vectors emerge as an outcome. It arises that $D_{min}$ will be preferably chosen on the order of $N^2$, wherein N corresponds to the dimension of the feature set. Corresponding to the above described processing steps the radial basis function classifier is constructed and supplied with the set of training data. Rejected, signals of the class $Z_k$ and false positives will be marked as incorrectly classified signals. Correctly classified signals of the class $Z_A$ will be appraised as correctly classified. This is also applicable for the rejected signals of class $Z_A$, since a rejection here likewise indicates on an irrelevant signal (corresponding to all signals of the class $Z_A$). The feature vectors of the signals S marked as falsely classified will be added to the set of the original reference vectors $G_l$ with a weighting of 1. The corresponding quantity serves as a reference vector in the training set for the next step in the boot strapping process.

In further progression of the process, the value $D_{min}$ is now chosen to be continuously smaller (corresponding to the above description in processing step d) ), so that a continuously larger amount of reference vectors $G_i$ emerge. Thereby it is achieved that the clustering algorithm multiple times takes into account the signals of the classes $Z_A$ which lie near the signals in the class $Z_k$ in feature set. This leads to the outcome that only a small amount of reference vectors are situated in the center of a class cluster in feature set, while the fringe area of a class cluster is occupied by a significantly large density of reference vectors. This leads to an improved delineation of the area of the classes $Z_k$ from the classes $Z_A$ in feature set.

The parameter $D_{min}$ is thereby decreased from one step in the bootstrapping process to the next so that the classification output of the training set is better in the current step than in the preceding step. In general, this causes a decrease of $D_{min}$ of 40% to take place. The exact value must, however, be experimentally ascertained.

The bootstrapping process is discontinued when no increases in the classification output can be attained.

In order to minimize the investment in calculation power and computer equipment, it is advantageous to undertake a reduction in the dimensions of the feature set. This can be achieved, for example, via the generally known major axis transformation. It is further possible to perform the dimension reduction via a local processing algorithm (C. Woehler, et al.: Dimensionality Reduction by Local Processing, European Symposium on Artificial Neural Networks, Bruegge, 1999). This algorithm is based upon a forward calculating neural network with spatial or space time receptive fields, as described in reference DE19802261. The network will be trained in a way that an intermediate signal sample can be used as an input signal for a further classifier. This should be, according to the process of the invention, for example, a polynomial classifier or a radial basis functions classifier.

Preferably the method of signal processing can be also developed as a computer program by which signals S are verified as to their association with objects of the desired class $Z_k$ and distinguished from objects of the undesired class $Z_A$. These computer programs can be stored on a storage medium and possibly be loaded into a computer. The computer program takes over a signal S delivered from a segmentation and directs it to a classification. This classification operates a classifier, from which an output value $P_{reject}$ is delivered that is compared to a given threshold t. Based upon this comparison a decision can be made as to whether the signal classified by the classifier should be assigned to a rejection class.

What is claimed is:

1. A process of signal processing, wherein signal S is verified for association with objects of desired classes $Z_k$ (with 1<=k<=number of different classes) and is differentiated from undesired objects, said process including:

defining one or more classes $Z_A$ of undesired objects, and beyond this a rejection class R as an additional class of undesired objects to which all signals S are assigned that are not positively assigned to one of the classes $Z_k$ or $Z_A$, and wherein a comparison of an adjustable threshold t with the output value $P_{reject}$, which is provided by a classification algorithm, serves as an evaluation criteria for the allocation of a signal S to the rejection class R.

2. The process according to claim 1, wherein the output value $P_{reject}$ delivered by the classification algorithm is produced in such a way, that the adjustment of the threshold value t directly affects the relationship of the probability of false classification of signals as belong to one of the class $Z_k$ to the probability of false classification of signals as belong to one of the classes $Z_A$.

3. Process according to claim 1, wherein the.classification algorithm, which provides value $P_{reject}$ to be compared to the threshold t, is a polynomial classifier.

4. The process according to claim 3, wherein the classification algorithm is so constructed that the output value $P_{reject}$ describes the square of the distance of the output vectors of the classification algorithm to the nearest vector describing a class in the decision space (RAD-critiera).

5. The process according to claim 4, wherein $P_{reject}$ is compared to the threshold value t, and that in the case that $P_{reject}$ is larger than the threshold value, the signal is assigned to the reject class.

6. The process according to claim 1, wherein the classification algorithm, which delivers a value $P_{reject}$ which is compared to the threshold t, is realized through a radial basis function classifier.

7. The process according to claim 6, wherein the radial basis function classifier is based upon a number of ramp functions $R(d_i)$, which are defined by two parameters $a_i$ and $b_i$, which are determined at the beginning of a clustering algorithm from the objects in the training set of the class $Z_k$ and $Z_A$.

8. The method of claim 7, wherein the clustering algorithm which serves as the starting point for the determination of the parameters $a_i$ and $b_I$ is an agglomeration clustering algorithm.

9. The method according to claim 8, wherein the clustering algorithm carries out the clustering in four processing steps a)–d) as follows:

a) first a number $M_k$ of objects of the class $Z_k$ in an amount corresponding to the training set reference vectors $G_i$, is determined; these reference vectors $G_i$ correspond to the $M_k$ objects of classes $Z_k$ in the feature set and will be weighted with the weighting $W_i=1$, for 1<=i<=Mk, b) subsequently, for each reference vector $G_i$ the one reference vector $G_j$ is determine that is the nearest lying to this and subsequently $G_i$ and $G_j$ are merged to a cluster pair $(G_i, G_j)$, c) the so formed cluster pair $(G_n, G_m)$ is replaced by a new vector $G_p$ that is determined according to the equation $G_p=(w_n G_n+w_m G_m)/(w_n+w_m)$, and to which the weight $w_p=(w_n+w_m)$ is assigned; finally, the data of the newly determined vectors $G_p$ and their weights $W_p$ take the place in the original data point of the original reference vectors $G_i$ and their weights $w_i$, d) the processing steps b) and c) are now repeated until the number of remaining reference vectors $G_i$ is smaller than a given number N, or the minimal distance between the single reference vectors $G_i$ becomes larger than a freely selectable distance value $D_{min}$.

10. The method according to claim 6, wherein the determination of the parameters $a_i$ and $b_i$ uses the reference vectors $G_i$ that are provided by the clustering algorithm and in the steps a)–d) the intermediate parameters $e_i$, $f_i$, $\mu_k$ and $\mu_{ave}$ are determined:

a) for each reference vector $G_j$, a parameter $e_i$ is determined, which describes the distance from this reference vector to the nearest cluster center of the same class, b) for each reference vector $G_i$ a parameter $f_i$ is determined, which describes the distance from this reference vector to the nearest cluster center of one of the other classes, c) for each class k the mean distance of all of the clusters $\mu_k$ belonging to this class to each other is determined, d) a mean distance $\mu_{ave}$ will be determined which corresponds to the mean value of all $\mu_k$.

11. The method according to claim 7, wherein the parameters $a_i$ and $b_i$ are determined via an assignment rule from the intermediate parameters $e_i$, $f_i$, $\mu_k$ and $\mu_{ave}$.

12. The method according to claim 7, wherein the value $p_{reject}$ for each signal S is determined from the ramp function $R(d_i)$ in the manner described below in intermediate steps a)–d):

a) for the signal S the distances $d_i$ to all reference vectors $G_i$ are calculated, b) the radial-basis-function classifier calculates the corresponding value $R(d_i)$ for each of these distances, c) subsequently a value $P_{sk}$ is calculated for each class k, which consists of the sum of all of the $R(d_i)$ assigned to this class, d) the sum of all of the $P_{sk}$ provides the intermediate value $S_p$.

13. The method according to claim 12, wherein the value for the probability $P_k$, that a signal S belongs to a determined class k is calculated by the parameters $P_{sk}$ and $S_p$ via an assignment rule.

14. The method according to claim 13, wherein $P_{reject}$ is set based upon the value of the largest of all of the values $P_k$ that were calculated for this signal.

15. The method according to claim 14, wherein $P_{reject}$ is compared to the threshold value t and in the case that $P_{reject}$ is smaller than the threshold value t, the signal is assigned to the reject class R.

16. The method according to claim 15, wherein if $S_p$ is smaller than or equal to 1, a supplementary parameter $P_{back}$ is produced which is set by the value $1-S_p$.

17. The method according to claim 16, wherein if $P_{back}$ is larger than all of the values $P_k$ calculated for the signal S, this signal is assigned to the reject class R.

18. The method according to claim 1, wherein bootstrapping is applied within the scope of the classification training, so that for the determination of the parameter of the classification algorithm in addition to the objects of the class $Z_k$ only such objects of the class $Z_A$ are used, which lie near the objects of the class $Z_k$ in the feature set.

19. The method of claim 18, wherein in the scope of the clustering process for the determination of the parameters $a_i$ and $b_i$ the bootstrapping takes place by the use of a radial-basis-function classifier.

20. The method according to claim 1, wherein the dimensions of the feature set is reduced.

21. The method of claim 20, wherein the dimension reduction is performed by a major axis transformation.

22. The method of claim 20, wherein the dimension reduction is performed by a local-processing algorithm.

* * * * *